UNITED STATES PATENT OFFICE.

EUGENE VEZIE, OF WASHINGTON, PENNSYLVANIA, ASSIGNOR OF ONE-HALF TO CHARLES R. BALLARD, OF MIDWAY, PENNSYLVANIA.

COMPOSITION FOR CLEANING BOILERS.

948,833.  Specification of Letters Patent.  Patented Feb. 8, 1910.

No Drawing.  Application filed June 10, 1909. Serial No. 501,313.

*To all whom it may concern:*

Be it known that I, EUGENE VEZIE, a resident of Washington, in the county of Washington and State of Pennsylvania, have invented a new and useful Improvement in Compositions for Cleaning Boilers, of which the following is a specification.

This invention relates to a compound or composition for removing and preventing incrustations in steam and hot water boilers, hot water radiators, cooling pipes for gas engine cylinders, and the like, and is an improvement upon prior compositions for this purpose.

Patent No. 824,112 of June 26, 1906 to Jacob R. Greene, Jr. describes a certain compound or composition for removing or preventing incrustations in steam boilers and the like due to mineral matters and other impurities contained in the water. The composition described in said patent consists of coffee, balsam weed, yarrow and powdered graphite. The composition described in said patent has given very satisfactory results in actual use, but I have discovered that the action can be improved, made more rapid and efficient by the addition of other ingredients to those above named. From actual tests I have found that the addition of tobacco and ordinary Epsom salts considerably improves the action of the ingredients named in said Greene patent. The improved composition as I have found it best adapted for this purpose consists of the following ingredients, and in substantially the proportions stated, to-wit; green coffee ten pounds, tobacco one pound, Epsom salts one ounce, balsam weed one ounce, yarrow one ounce, and graphite one ounce. The coffee is, as stated in the Greene patent, preferably used in the unroasted form, that is while green. The tobacco may be of any character, preferably the waste portions from cigar and other factories, or for that matter tobacco which is practically spoiled, but which contains the active ingredients. This composition can be formed as stated in the Greene patent with the ingredients in a fairly fine condition, and is preferably used in the same manner as there stated, that is, inclosed in a fabric casing and then introduced into the boiler where it will remain in a mass so that the active ingredients are leeched out slowly and the efficiency of the compound extended over a considerable period of time.

Actual use of the composition above described has given very excellent results. The composition has thoroughly cleaned boiler tubes which have been so badly incrusted that it was not possible to clean the same in any other way, and which were in such condition that the tubes were considered to be practically ruined. My improved composition has not only quickly softened up the deposits and incrustations so that they could be washed out, but so thoroughly cleaned the metal that further corrosion thereof has been practically stopped.

What I claim is:

1. A composition for preventing and removing incrustations in boilers and like devices having coffee and tobacco as its principal ingredients.

2. A composition for preventing and removing incrustations in boilers and the like, having coffee and tobacco as its principal ingredients and also containing Epsom salts.

3. A composition for preventing and removing ingredients in boilers and the like, consisting of coffee, tobacco, balsam weed and Epsom salts.

4. A composition for preventing and removing incrustations in boilers and the like, having coffee and tobacco as its principal ingredients and also containing pulverized graphite.

5. A composition for preventing and removing incrustations in boilers and the like, consisting of coffee, tobacco, balsam weed, Epsom salts, yarrow and pulverized graphite.

In testimony whereof, I have hereunto set my hand.

EUGENE VEZIE.

Witnesses:
F. W. WINTER,
JAS. L. WELDON.